United States Patent
Shih

(10) Patent No.: US 6,280,807 B1
(45) Date of Patent: *Aug. 28, 2001

(54) EDGE JOINT STRUCTURE FOR CONNECTING A WATERPROOF THERMAL INSULATION PANEL WITH A FABRIC PANEL FOR WADER OF SIMILAR OUTDOOR WEAR

(76) Inventor: Arthur Tseshao Shih, 2443 Seaman Ave., South El Monte, CA (US) 91733

( * ) Notice: Subject to any disclaimer, the term of this patent is extended or adjusted under 35 U.S.C. 154(b) by 0 days.

This patent is subject to a terminal disclaimer.

(21) Appl. No.: 09/541,535

(22) Filed: Apr. 3, 2000

(51) Int. Cl.[7] .......................................................... B32B 3/10
(52) U.S. Cl. ........................................... 428/57; 156/304.5
(58) Field of Search .................................. 428/57, 60, 61; 2/275, 2.16; 156/304.5

(56) References Cited

U.S. PATENT DOCUMENTS 3,243,337 * 3/1966 Haselow et al. ........................ 428/57
6,124,010 * 9/2000 Shih ........................................ 428/60

* cited by examiner

*Primary Examiner*—Alexander S. Thomas
(74) *Attorney, Agent, or Firm*—Raymond Y. Chan; David and Raymond Patent Group

(57) ABSTRACT

An edge joint structure for connecting a waterproof thermal insulation panel with a fabric panel for wader or similar outdoor wear, which includes a base connection edge provided at an end portion of the waterproof thermal insulation panel and connecting end edge provided at an end portion of the fabric panel. An end portion of a lining layer of the waterproof thermal insulation panel is removed to form the base connection edge and define a base connection surface on a back side of the base connection edge. The connecting end edge has a width equal to a width of the base connection surface is adhered on the base connection surface of the base connection edge of the waterproof thermal insulation panel so as to firmly connect the waterproof thermal insulation panel with the fabric panel overlappedly.

16 Claims, 7 Drawing Sheets

EDGE JOINT STRUCTURE FOR CONNECTING A WATERPROOF THERMAL INSULATION PANEL WITH A FABRIC PANEL FOR WADER OF SIMILAR OUTDOOR WEAR

BACKGROUND OF THE PRESENT INVENTION

1. Field of Invention

The present invention relates to outdoor wears, such as fishing and hunting waders, and more particularly to an edge joint structure for strongly and firmly connecting a waterproof thermal insulation panel with a breathable fabric panel for producing wader or similar outdoor wear which features a thermal insulating leg portion made of reinforced waterproof, breathable and laminate material and a fabric upper portion made of waterproof and breathable fabric material such as Nylon or the like.

2. Description of Related Arts

Wader 1 or similar outdoor wear provided in market for outdoor sports such as hunting and fishing, as shown in FIG. 1, are constructed from top to bottom with various kinds of wader material A10 such as "NEOPRENE". These conventional wader materials have waterproof and thermal insulation features enabling the users to wade through a stream and keep the body temperature in cold water.

The conventional wader material A10, as shown in FIG. 2, includes a waterproof, breathable layer A11 made of foaming material or synthetic rubber, an outer cover layer A12 made of flexible cloth material such as nylon jersey knit or plush, and an inner lining layer A13 made of fabric or jersey.

The seam A14 formed at the connection between the right and left panels, as shown in FIG. 1, is constructed by a conventional edge joint structure that simply adheres two end edges of the right and left panels edge-edge together and then sealedly covers with two fabric tapes A15 at both sides respectively. Such a gluing type edge joint structure is a kind of weak structure because the area of connection is limited to the cross section area of the respective end edge, i.e. the width xthe thickness.

U.S. Pat. No. 5,022,096 suggests another kind of edge joint structure that the stretchable laminate is stitched by thread to the non-stretch laminate and the holes and gaps in the seam are sealed with tape. However, the connection between the laminates is relatively weak since the connection is based on stitching.

As mentioned above, the entire wader is constructed with foaming laminated material for thermal insulation purpose. However, due to the fact that most of the time the wearers (fishermen or hunters) are merely get their leg portions wet or immersed their leg into cold water. Sometimes, the wearers may also need to immerse their waist portion in water. But, there is nearly unnecessary to have the wearers' chest portions immersed in water because it may be too deep for them to freely and effectively operate their fishing rods or hunting rifles.

It is absolutely truth that the foaming laminated material is good at thermal insulation especially for the legs immersed in cold water. However, the wearer's chest portion and even the waist portion above water may feel uncomfortable and hot during warm weather since they are covered by such thermal insulating material.

A solution to the above shortcoming of the conventional outdoor wear is to use thermal insulating material to construct the lower leg portion and use thin fabric material to construct the upper chest portion and even the waist portion. However, both the conventional end-gluing type and stitching type edge joint structures as described fail to provide a firm and durable connection. Especially, stitching is not strong enough for connection when it is used for making tough or heavy duty clothes. The end-gluing type or stitching type end edge structure may easy to break when a horizontal force is applied to the two laminates. So, the conventional edge joint structure is not a reasonable structure to provide liable and good connection between the thermal insulating panel and the fabric panel.

SUMMARY OF THE PRESENT INVENTION

The main object of the present invention is to provide an edge joint structure for strongly and firmly connecting a waterproof thermal insulation panel with a breathable fabric panel for producing a wader or similar outdoor wear which features a thermal insulating leg portion made of reinforced waterproof, breathable and laminate material and a fabric upper portion made of breathable clothing material.

Another object of the present invention is to provide an edge joint structure for strongly and firmly connecting the waterproof, thermal insulating leg portion and waist portion with a layer of breathable fabric made chest portion of a wader or similar outdoor wear.

Another object of the present invention is to provide an edge joint structure for strongly and firmly connecting the waterproof, thermal insulating leg portion with the fabric made waist and chest portions of a wader or similar outdoor wear.

Another object of the present invention is to provide an edge joint structure for chest high wader or similar outdoor wear that can be converted into a waist wader.

Another object of the present invention is to provide a method of connecting a waterproof thermal insulation panel with a breathable fabric panel for producing a wader or similar outdoor wear.

Accordingly, in order to accomplish the above objects, the present invention provides an edge joint structure for wader or similar outdoor wear, which comprises:

a base connection edge provided at an end portion of a waterproof thermal insulation panel which comprises a waterproof, thermal insulating main layer made of foaming material or synthetic rubber, a front cover layer made of flexible cloth material integrally attaching to a front surface of the main layer, and a fabric made back lining layer integrally attaching to a back surface of the main layer, wherein the lining layer of the end portion of the waterproof thermal insulation panel is removed to form the base connection edge and define a base connection surface on a back side of the base connection edge;

a connecting end edge provided at an end portion of a fabric panel made of fabric material such as Nylon and the like, wherein the connecting end edge which has a width equal to a width of the base connection surface is adhered on the base connection surface of the base connection edge of the waterproof thermal insulation panel so as to firmly connect the waterproof thermal insulation panel with the fabric panel;

a front tape adhering on a front joint junction of the cover layer of the waterproof thermal insulation and the fabric panel; and a back tape adhering on a back joint junction of the lining layer of the waterproof thermal insulation and the fabric panel.

The edge joint structure of the present invention is adapted for connecting the waterproof thermal insulation panel with the breathable fabric panel for producing a wader or similar outdoor wear which uses the waterproof thermal insulation panel (made of the reinforced waterproof and laminate material) to form a thermal insulating leg portion and the fabric panel (made of the breathable fabric material such as Nylon) to form a fabric upper portion.

DETAILED DESCRIPTION OF THE PREFERRED EMBODIMENT

Figure 3:
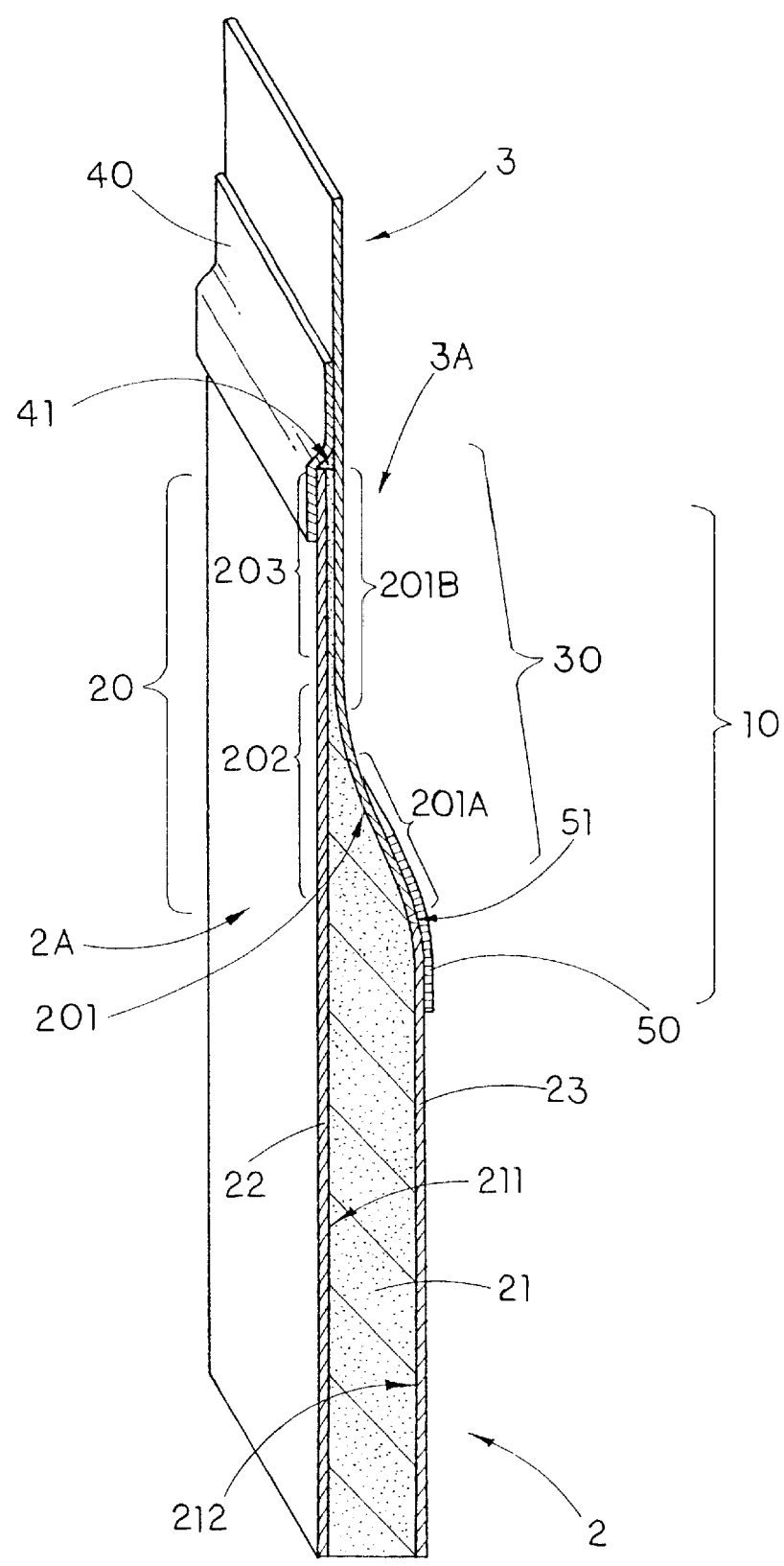
FIG. 3 is a sectional perspective of an edge joint structure according to a preferred embodiment of the present invention.

Referring to FIG. 3, an edge joint structure 10 for wader or similar outdoor wear according to a preferred embodiment of the present invention is illustrated, which comprises a base connection edge 20 and a connecting end edge 30 overlappedly connected together.

The base connection edge 20 is provided at an end portion 2A of a waterproof thermal insulation panel 2. The waterproof thermal insulation panel 2 comprises a waterproof, thermal insulating main layer 21 made of foaming material such as neoprene or synthetic rubber, a front cover layer 22 made of flexible fabric material, such as nylon jersey knit, plush or cotton, integrally attaching to a front surface 211 of the main layer 21, and a back lining layer 23 made of clothing material, such as fabric or nylon jersey knit, integrally attaching to a back surface 212 of the main layer 21, wherein the lining layer 23 of the end portion 2A of the waterproof thermal insulation panel 2 is removed to form the base connection edge 20 and define a base connection surface 201 on a back side of the base connection edge. 20

In other words, as shown in FIG. 3, the base connection edge 20 is merely constructed by two layers, i.e. the main layer 21 and the cover layer 22. The base connection edge 20 has a root edge portion 202 and an end edge portion 203. The main layer 21 of the root edge portion 202 gradually reduces its thickness to form an inner inclined portion 201A of the base connection surface 201. The main layer 21 of the end edge portion has a thinner thickness to form an outer flat portion 201B.

The connecting end edge 30 is provided at an end portion 3A of a fabric panel 3. The connecting end edge 30, which has a width, preferably 1–2 inches, equal to a width of the base connection surface 201, is adhered on the base connection surface 201 of the base connection edge 20 of the waterproof thermal insulation panel 2 so as to firmly connect the waterproof thermal insulation panel 2 with the fabric panel 3 overlappedly.

It is worth to mention that the surface area of the base connection surface 201 is greatly larger than the cross section area of the waterproof thermal insulation panel 2. Therefore, the adhesive force between the connecting end edge 30 and the base connection edge 20 is largely increased for ensuring strong and firm connection of the waterproof thermal insulation panel 2 and the fabric panel 3.

The edge joint structure 10 of the preferred embodiment of the present invention further comprises a fabric made front tape 40 and a fabric made back tape 50. The front tape 40 is adhered on a front joint junction 41 of the cover layer 22 of the waterproof thermal insulation panel 2 and the fabric panel 3. The back tape 50 is adhered on a back joint junction 51 of the lining layer 23 of the waterproof thermal insulation panel 2 and the fabric panel 3. The two front and back tapes 40, 50 provide advantages such as decorating, anti-scratching and waterproof.

Figure 5:
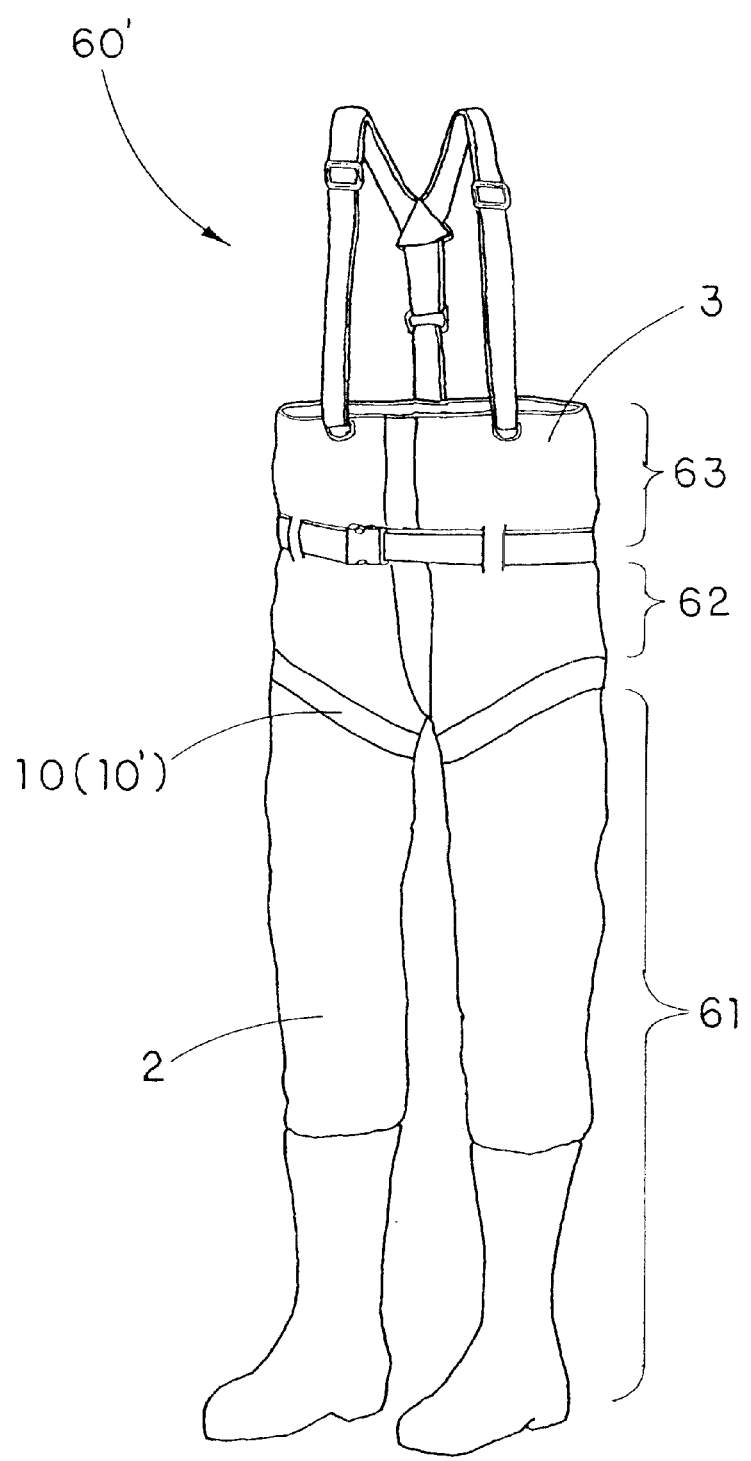
FIG. 5 is a front view of a chest high wader incorporated with the edge joint structure according to the above preferred embodiment, wherein both the chest portion and the waist portion of the wader are made of the fabric panel while the leg portion of the wader is made of the waterproof thermal insulation panel.

The edge joint structure 10 of the present invention is adapted for connecting the waterproof thermal insulation panel 2 with the breathable fabric panel 3 for producing a wader 60 or similar outdoor wear, as shown in FIG. 5, wherein the waterproof thermal insulation panel 2 is used to construct a thermal insulating leg portion 61 and the fabric panel 3 is used to construct an fabric upper portion including a waist portion 62 and a chest portion 63.

It is worth to mention that the gradual reduction of the thickness of the edge joint structure 10 provides a more comfortable and smooth junction between the leg portion 61 and the waist portion 62.

Figure 6:
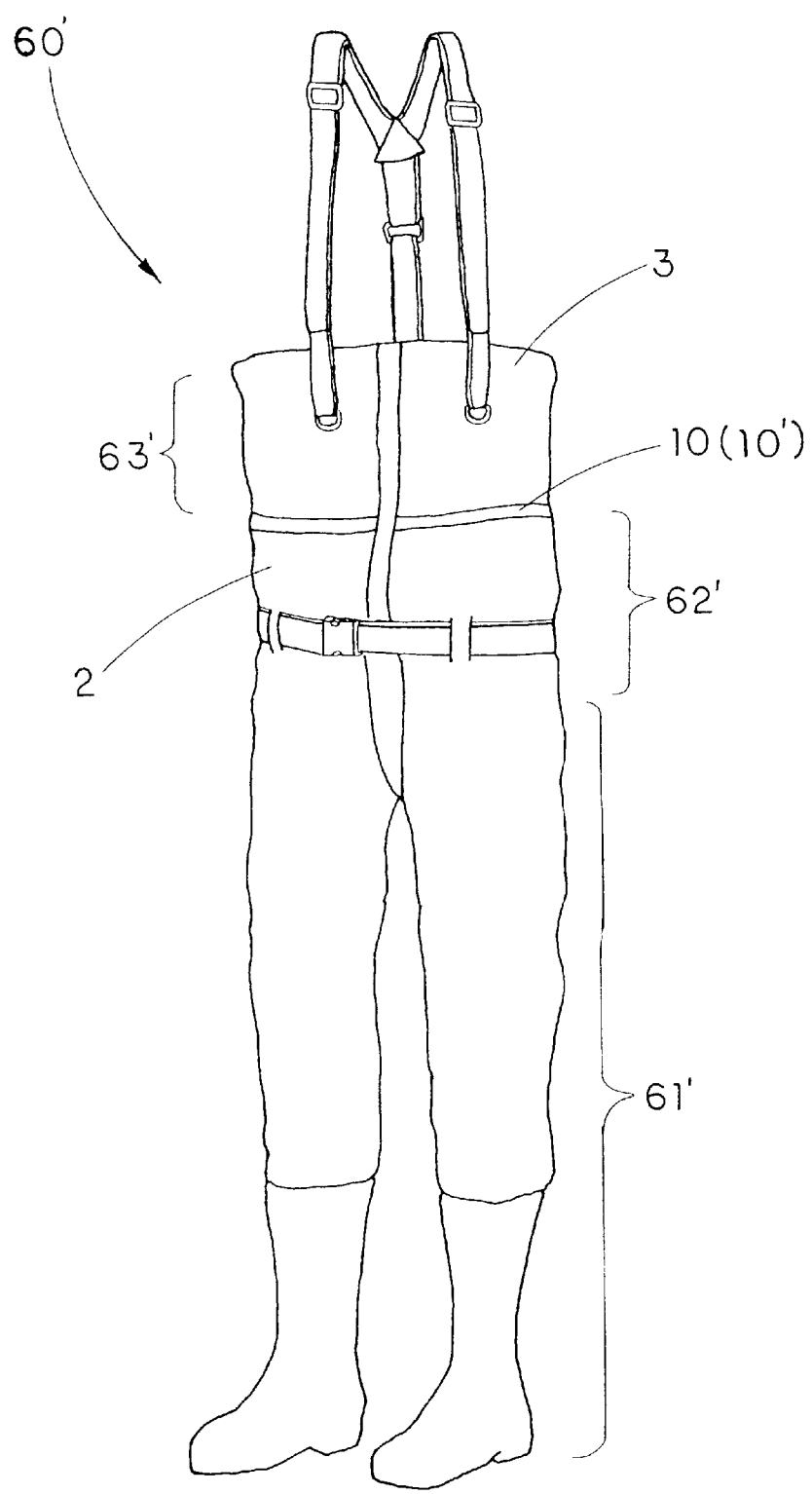
FIG. 6 is a front view of a chest high wader incorporated with the edge joint structure according to the above preferred embodiment, wherein both the leg portion and the waist portion of the wader are made of the waterproof thermal insulation panel while the chest portion of the wader is made of the fabric panel.

As shown in FIG. 6, another type of wader 60' incorporated with the edge joint structure 10 is illustrated, wherein the waterproof thermal insulation panel 2 is used to construct both the leg portion 61' and the waist portion 62' and the fabric panel 3 is used to construct the chest portion 63'. The edge joint structure 10 is used for strongly and firmly connecting the waist portion 62' made of the waterproof thermal insulation panel 2 with the chest portion 63' made of the fabric panel 3.

Figure 7:
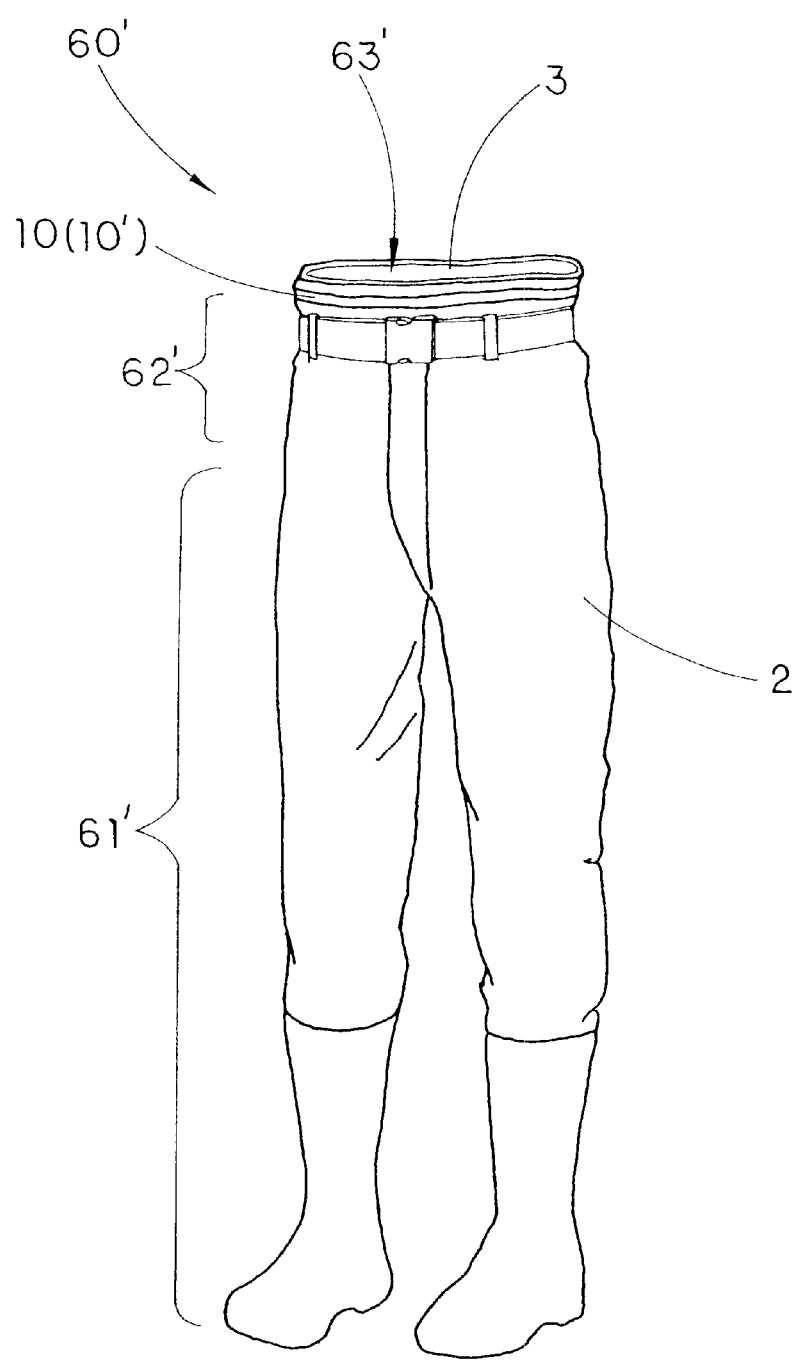
FIG. 7 is a front view of a chest high wader incorporated with the edge joint structure so that it can be converted into a waist wader according to the above preferred embodiment of the present invention.

Since at least the chest portion 63 or 63' of the chest high wader 60 or 60' is made of thin fabric panel 3, the wearer can easily convert the chest high wader 60 or 60' into a waist wader as shown in FIG. 7 by folding the thin chest portion 63' inside the waist portion 62'.

Figure 4:
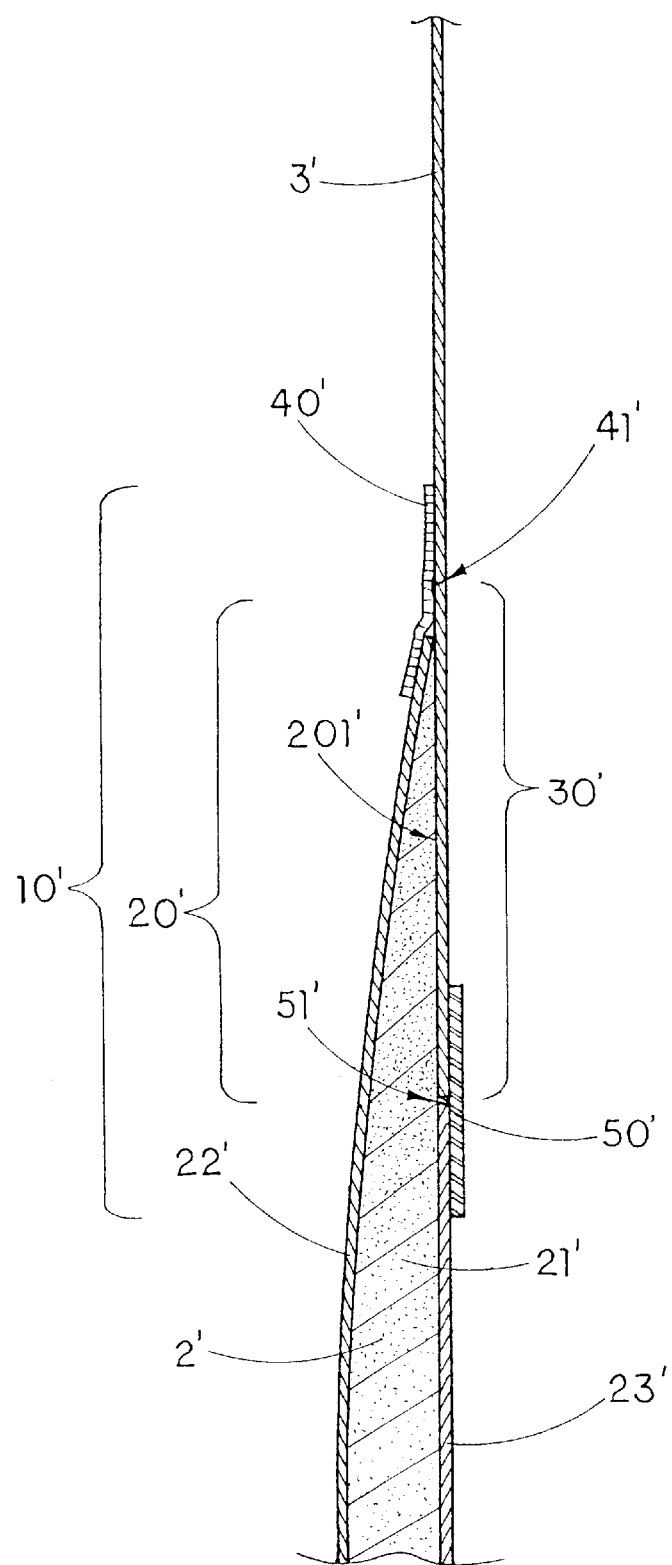
FIG. 4 is a sectional perspective view of an alternative mode of the edge joint structure according to the above preferred embodiment of the present invention.

Referring to FIG. 4, an alternative edge joint structure 10' is illustrated, which is modified from the above disclosed edge joint structure 10 to have similar structure, wherein the base connection surface 201' is a slant surface. In other words, the main modification is the main layer 21' of the base connection edge 20' reduces its thickness gradually to form a V-shaped cross section for the base connection edge 20'. Accordingly, the connecting end edge 30' of the fabric panel 3', which is adhered on the base connection surface 201', can be arranged to continuously and flatly extend from the lining layer 23' of the waterproof thermal insulation panel 2'.

The edge joint structure 10' can also be constructed in the waders 60, 60' as shown in FIGS. 5 to 7. Therefore, the wearer of the wader 60 or 60' can substantially feel a more comfortable flat interior surface.

Accordingly, referring to FIGS. 3 and 4, the edge joint structure 10, 10' is constructed by the following method, which includes the steps of:

(a) cutting out an end portion of a lining layer 23, 23' of a waterproof thermal insulation panel 2, 2' which comprises a main layer 21, 21' having a front surface covered by a cover layer 22, 22' and a back surface covered by the lining layer 23, 23';

(b) reducing a thickness of an end portion of the main layer 21, 21' to form a base connection edge 20, 20' having a base connection surface 201, 201' on a back side thereof;

(c) applying a layer of adhesive material on the base connection surface 201, 201' of the base connection edge 20, 20' and a connecting end edge 30, 30' which is an end portion of a fabric panel 3, 3';

(d) adhering the connecting end edge 30, 30' of the fabric panel 3, 3' onto the base connection surface 201, 201' of the base connection edge 20, 20' so as to firmly connect the base connection edge 20, 20' of the waterproof thermal insulation panel 2, 2' with the connecting end edge 30, 30' of the fabric panel 3, 3';

(e) adhering a front tape 40, 40' on a front joint junction 41, 41' of the cover layer 22, 22' of the waterproof thermal insulation panel 2, 2' and the fabric panel 3, 3'; and (f) adhering a back tape 50, 50' a back joint junction 51, 51' of the lining layer 23, 23' of the waterproof thermal insulation panel 2, 2' and the fabric panel 3, 3'.

According to the preferred embodiment of the present invention, in order to connect the fabric panel 3, 3' to the waterproof thermal insulation panel 2, 2', the adhesive material is preferred to evenly apply to both the base connection surface 201, 201' of the base connection edge 20, 20' and the connecting end edge 30, 30'. Then, press the connecting end edge 30, 30' against the base connection edge 20, 20' until the they are firmly adhered with each other, so that the connecting end edge 30, 30' is overlappingly connected on the base connection edge 20, 20' to form the edge joint structure 10, 10' of the present invention.

An unexpected effect is achieved by the present invention that when the front tape 40, 40' is glued on the front joint junction 41, 41', a pressure is applied on the front tape 40, 40' in order to firmly stick on the cover layer 22 of the waterproof thermal insulation panel 2 and the fabric panel 3. The front tape 40, 40' will not only provide a better insulation and waterproofing but also protect the edge joint structure 10, 10'. Since the waterproof thermal insulation panel 2 is thicker than the fabric panel 3, when the edge base connection edge 20, 20' is overlappingly connected on the connecting end edge 30, 30', the front tape 40, 40' and the back tape 50, 50' are adapted to seal the junction for not only protecting the front joint junction 41, 41' and the back joint junction 51, 51' respectively but also further ensuring the insulation and waterproofing.

Figure 1:
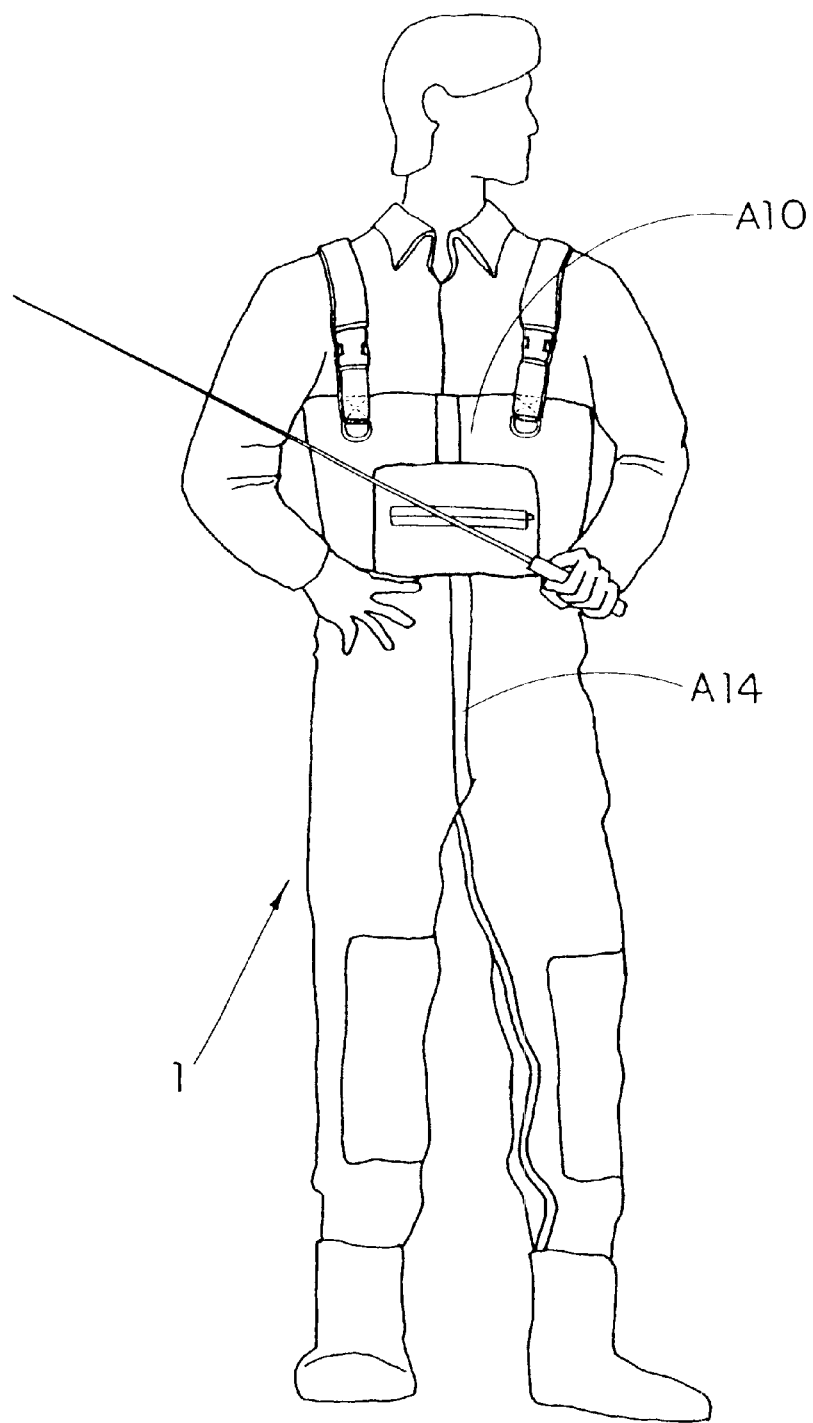
FIG. 1 is a schematic view illustrating a conventional fishing wader.
Figure 2:
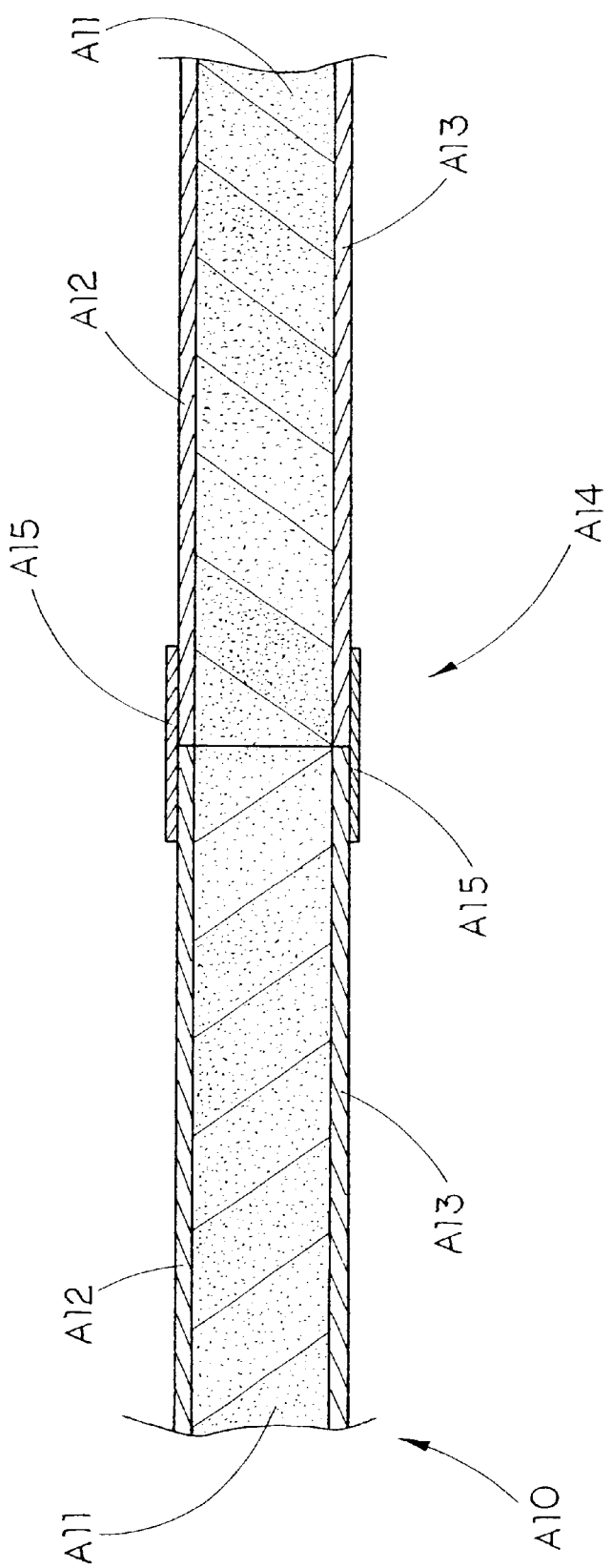
FIG. 2 is a sectional view of a conventional edge joint structure with fabric tape covered.

The edge joint structure 10, 10' of the present invention provides a larger adhering surface area, i.e. the base connection surface 201, 201', comparing to the conventional edge to edge joint structure as shown in FIG. 2. It is known that the larger connection area is provided, the greater connection force is obtained. So, the connection forces, which are produced between the base connection edge 20, 20' and the connecting end edge 30, 30', are in same direction in order to hold the waterproof thermal insulation panel 2, 2' and the fabric panel 3, 3' together. In other words, the separation forces, which opposite to the connection forces in order to attempt pulling the base connection edge 20, 20' and the connecting end edge 30, 30' apart to separate the edge joint structure 10, 10', can be afforded on the edge joint structure 10, 10' since the separation forces are divided by the connection surface. As the connection forces increase, the separation forces decrease; the edge joint structure 10, 10' of the present invention can firmly attach the waterproof thermal insulation panel 2, 2' and the fabric panel 3, 3' together.

Furthermore, how much the separation forces applied on the edge joint structure 10, 10' in order to break the structure can be determined in practice. So, simply increase or decrease the base connection surface 201, 201' of the base connection edge 20, 20', the greater or smaller connection forces are provided to hold the waterproof thermal insulation panel 2, 2' and the fabric panel 3, 3'. In other words, simply adjusting the connection area of the base connection surface 201, 201', suitable connection forces are provided for necessary according to how tough the suit is needed. Another practical effect can be achieved by increasing the connection area is to provide a better insulation and waterproofing since it is the area of the waterproof thermal insulation panel 2, 2' overlapped with and the fabric panel 3, 3'.

What is claimed is:

1. An edge joint structure for connecting a waterproof thermal insulation panel with a fabric panel, comprising:

a base connection edge provided at an end portion of said waterproof thermal insulation panel which comprises a waterproof, thermal insulating main layer, a front cover layer integrally attaching to a front surface of said main layer, and a back lining layer integrally attaching to a back surface of said main layer, wherein said lining layer of said end portion of said waterproof thermal insulation panel is removed to form said base connection edge and define a base connection surface on a back side of said base connection edge; and a connecting end edge provided at an end portion of the fabric panel, wherein said connecting end edge which has a width equal to a width of said base connection surface is adhered on said base connection surface of said base connection edge of said waterproof thermal insulation panel so as to firmly connect said waterproof thermal insulation panel with said fabric panel overlappedly.

2. The edge joint structure, as recited in claim 1, further comprising a front tape adhering on a front joint junction of said cover layer of said waterproof thermal insulation and said fabric panel.

3. The edge joint structure, as recited in claim 2, further comprising a back tape adhering on a back joint junction of said lining layer of said waterproof thermal insulation and said fabric panel.

4. The edge joint structure, as recited in claim 3, wherein said base connection edge is constructed by said main layer and said cover layer, said base connection edge having a root edge portion and an end edge portion, said main layer of said root edge portion gradually reducing a thickness thereof to form an inner inclined portion of said base connection surface, said main layer of said end edge portion having a thinner equal thickness to form an outer flat portion.

5. The edge joint structure, as recited in claim 3, wherein said base connection surface is a slant surface and said main layer of said base connection edge reduces a thickness thereof gradually to form a V-shaped cross section.

6. The edge joint structure, as recited in claim 2, wherein said base connection edge is constructed by said main layer and said cover layer, said base connection edge having a root edge portion and an end edge portion, said main layer of said root edge portion gradually reducing a thickness thereof to form an inner inclined portion of said base connection surface, said main layer of said end edge portion having a thinner equal thickness to form an outer flat portion.

7. The edge joint structure, as recited in claim 2, wherein said base connection surface is a slant surface and said main layer of said base connection edge reduces a thickness thereof gradually to form a V-shaped cross section.

8. The edge joint structure, as recited in claim 1, further comprising a back tape adhering on a back joint junction of said lining layer of said waterproof thermal insulation and said fabric panel.

9. The edge joint structure, as recited in claim 8, wherein said base connection edge is constructed by said main layer and said cover layer, said base connection edge having a root edge portion and an end edge portion, said main layer of said root edge portion gradually reducing a thickness thereof to form an inner inclined portion of said base connection surface, said main layer of said end edge portion having a thinner equal thickness to form an outer flat portion.

10. The edge joint structure, as recited in claim 8, wherein said base connection surface is a slant surface and said main layer of said base connection edge reduces a thickness thereof gradually to form a V-shaped cross section.

11. The edge joint structure, as recited in claim 1, wherein said base connection edge is constructed by said main layer and said cover layer, said base connection edge having a root edge portion and an end edge portion, said main layer of said root edge portion gradually reducing a thickness thereof to form an inner inclined portion of said base connection surface, said main layer of said end edge portion having a thinner equal thickness to form an outer flat portion.

12. The edge joint structure, as recited in claim 1, wherein said base connection surface is a slant surface and said main layer of said base connection edge reduces a thickness thereof gradually to form a V-shaped cross section.

13. A method for connecting a waterproof thermal insulation panel with a fabric panel, including the steps of:
   (a) cutting out an end portion of a lining layer of the waterproof thermal insulation panel which comprises a main layer having a front surface covered by a cover layer and a back surface covered by said lining layer;
   (b) reducing a thickness of an end portion of said main layer to form a base connection edge having a base connection surface on a back side thereof;
   (c) applying a layer of adhesive material on said base connection surface of said base connection edge and a connecting end edge which is an end portion of a fabric panel; and
   (d) adhering said connecting end edge of said fabric panel onto said base connection surface of said base connection edge so as to firmly connect said base connection edge of said waterproof thermal insulation panel with said connecting end edge of said fabric panel overlappedly.

14. The method as recited in claim 13, after the step (d), further comprising a step of adhering a front tape on a front joint junction of said cover layer of said waterproof thermal insulation panel and said fabric panel.

15. The method as recited in claim 14 further comprising a step of adhering a back tape a back joint junction of said lining layer of said waterproof thermal insulation panel and said fabric panel.

16. The method as recited in claim 13, after the step (d), further comprising a step of adhering a back tape a back joint junction of said lining layer of said waterproof thermal insulation panel and said fabric panel.

\* \* \* \* \*